United States Patent [19]

Solleder et al.

[11] Patent Number: 4,509,802
[45] Date of Patent: Apr. 9, 1985

[54] INSTALLATION FOR CHARGING A PRESSURE RESERVOIR PROVIDED AS A PRESSURE SOURCE WITHIN A PROPULSION CONTROL SYSTEM OF A MOTOR VEHICLE

[75] Inventors: Friedrich Solleder, Waiblingen; Hellmut Krohn, Esslingen; Manfred Burckhardt, Wiblingen; Franz Brugger, Winnenden, all of Fed. Rep. of Germany

[73] Assignee: Daimler-Benz Aktiengesellschaft, Stuttgart, Fed. Rep. of Germany

[21] Appl. No.: 419,486

[22] Filed: Sep. 17, 1982

[30] Foreign Application Priority Data

Sep. 18, 1981 [DE] Fed. Rep. of Germany ....... 3137287
Sep. 18, 1981 [DE] Fed. Rep. of Germany ....... 3137286

[51] Int. Cl.³ .............................................. B60T 8/02
[52] U.S. Cl. ..................................... 303/110; 180/197; 303/57
[58] Field of Search ................... 180/197; 303/10, 11, 303/57, 93, 95, 96, 100, 110, 119

[56] References Cited

U.S. PATENT DOCUMENTS

| 3,880,474 | 4/1975 | Scharlack | 303/110 |
| 4,236,595 | 12/1980 | Beck et al. | 180/197 X |
| 4,344,139 | 8/1982 | Miller et al. | 180/197 X |
| 4,416,347 | 11/1983 | Bertling et al. | 180/197 |

Primary Examiner—Duane A. Reger
Attorney, Agent, or Firm—Walter W. Burns, Jr.

[57] ABSTRACT

In a vehicle equipped with a propulsion control system combined with an anti-blocking system, a pressure reservoir provided as a brake pressure supply-source which can be charged by means of the return pump of the anti-blocking system, whereby the charging operation is valve-controlled so that the feed from the return pump is directed into the pressure reservoir during pressure-reduction phases of the propulsion control system, the pressure reservoir can also be charged, outside the control phases of the propulsion control system, either by operating the driver's brake pedal or by automatic activation of a charging circuit accompanied by the operation of the return pump.

46 Claims, 10 Drawing Figures

FIG. 6
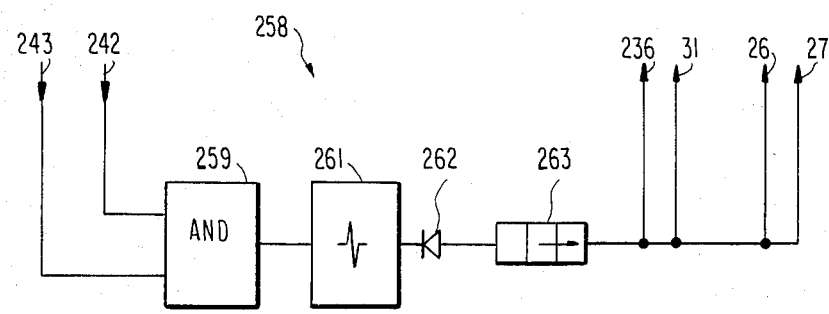
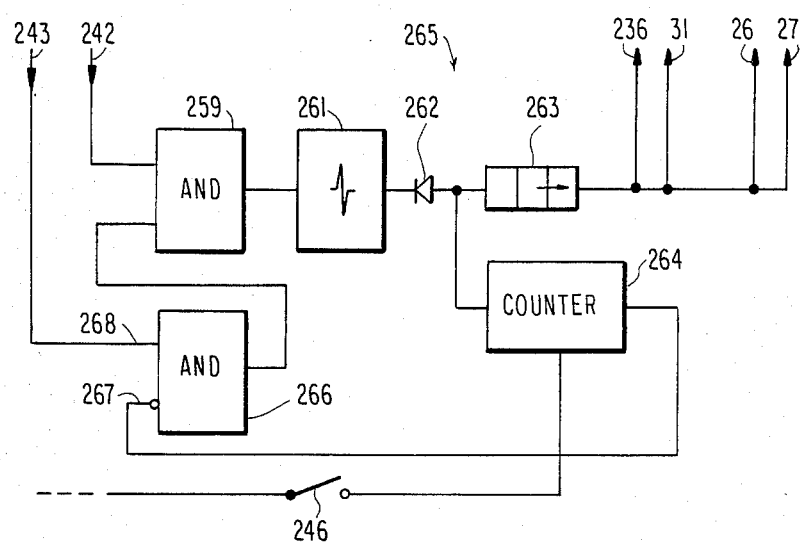
FIG. 7

INSTALLATION FOR CHARGING A PRESSURE RESERVOIR PROVIDED AS A PRESSURE SOURCE WITHIN A PROPULSION CONTROL SYSTEM OF A MOTOR VEHICLE

The present invention relates to an installation for charging a pressure reservoir provided as a pressure source, within the scope of a propulsion control system of a motor vehicle, wherby pressure is applied from this reservoir during control phases of the propulsion control system, to the wheel-brake of the wheel which, at the instant in question, is tending to spin or rotate.

The combination, with an anti-blocking system, of a propulsion control system which, with dissimilar adhesion coefficients at the driven vehicle-wheels, is capable of exercising an effect analogous to that of a locking differential by activating the wheel-brake of the wheel which, at the instant in question, is tending to spin, is advantageous because important functional parts of the anti-blocking system, for example, the devices for monitoring the state of motion of the vehicle wheels, the wheel-speed sensors, and the brake-pressure regulating valves which are provided for regulating the brake-pressures at the wheel-brakes, can be utilized at the same time within the scope of the propulsion control system for analogous purposes so that to that extent a propulsion control system requires only a small additional constructive expenditure.

However, problems are generally encountered in connection with a suitable construction of the auxiliary pressure source, from which pressure is applied, during the control phases of the propulsion control system, to the wheel-brake of a driven wheel which, at the instant in question, is tending to spin or rotate. According to a previous Patent Application filed by the assignee of the present application (P 31 27 302.5), relating to the combination of an anti-blocking system with a propulsion control system, the pump of a hydraulic steering assist unit which is buffered by an accumulator or reservoir on the outlet side is used as the auxiliary pressure source. However, the output pressure of this pump, approximately 60-80 bar, is not adequate under all road and operating conditions for a direct application to the wheel-brakes by way of the brake-pressure regulating valves coordinated thereto, especially under conditions which are likely to prevail in the case of high performance motor vehicles. Accordingly an additional pressure intensifier is required, which effects the hydraulic coupling of the auxiliary pressure source to the brake circuit of the driven vehicle-wheels and which simultaneously boosts the output pressure of the auxiliary pressure source to the required level. The pressure intensifier provided for this purpose possesses a floating dividing-piston, which is constructed as a stepped piston, whose smaller piston-step delimits a secondary pressure-chamber interconnected into the brake line of the brake circuit of the driven vehicle-wheels, and whose larger piston-step, which is larger by a factor equal to the required intensification or transformation ratio, delimits the primary pressure-chamber of the pressure intensifier, and can be connected valve-controlled to the auxiliary pressure source in a manner which is functionally appropriate in the sense of the propulsion control. Admittedly a recharge of the pressure reservoir can be achieved to a certain extent, during pressure reduction phases of the propulsion control; nonetheless a charging pump has to be provided in the installation according to the previous Patent Application in order to be able to compensate for leakage losses, since the recharging capacity of the floating pressure-intensifier piston is limited. Moreover, the increased constructional expenditure for the hydraulic adjusting device or servo unti of a propulsion control system combined with an anti-blocking system, which results from the need for a pressure intensifier, is considerably and is associated with corresponding costs.

Added thereto is the fact that, depending on the output pressure-level of the vehicle's own pressure source which is available as an auxiliary pressure source, and depending on the maximum required brake pressure, the pressure intensifier must be designed to provide a definite intensification or transformation ratio, specific to the particular type of which in question; accordingly it is impossible, in practice to structurally integrate such a pressure intensifier into the hydraulic adjusting element or servo unit of this combined installation, which includes the brake-pressure regulating valves and the return pump of the anti-blocking system respectively of the propulsion control system, which as such would be necessary in the interests of rational, economical series-production. Corresponding considerations apply if a separate charging pump has to be provided for charging the pressure reservoir, when dispensing with the use of a pressure source already available on the vehicle.

A further disadvantage resides in the coupling of the propulsion control system to this external pressure source, as required by the aforementioned arrangement, and the functional dependence connected therewith. Since, moreover, the braking system and the steering-assist pump operate with different pressure-media, a coupling is not necessarily desirable from this point of view.

Accordingly, the principal object of the present invention resides in providing an installation of the type mentioned hereinabove whose hydraulic adjusting element or servo unit is altogether of considerably simpler construction and therefore is amenable to rational economic series-production.

The underlying problems are solved, according to the present invention in that the pressure reservoir is constructed as a high-pressure reservoir adapted to be charged to a pressure of about 160-200 bar, as required for the pressure application of the wheel brakes, which is connected to the brake line leading to the brake pressure valves of the driven wheels in an energized functional position of a solenoid valve arrangement, logically linked with an activation of the propulsion control system in the normal position of which the outlet pressure space of the master brake cylinder, coordinated to the driven wheel brakes is connected to the brake line leading to brake pressure regulating valves of the driven wheels, in that the high-pressure reservoir, in lieu of the master brake cylinder, is directly connected with this brake line and as a result thereof is rechargeable by means of a return pump also connected on its output side to this brake line, and in that a pressure monitor is provided responsive to the reservoir pressure, which produces an output signal when the pressure in the reservoir drops to a predetermined minimum value, whereby a charging of the reservoir can be initiated by means of this output signal.

As a result of the utilization of the return pump of the anti-blocking system for pumping back the brake pressure-medium and recharging a pressure reservoir coordinated to the propulsion control system, from which, during the active control phases of this system takes place the pressure application, to the wheel-brake of the driven wheel which, at the instant in question, is tending to spin, a considerable simplification of the hydraulic adjusting element or servo unit, which is required for the anti-blocking and propulsion control systems, is obtained, and a far-reaching constructional integration of the hydraulic components of the two control systems, which function independently of one another, is achieved, which is particularly advantageous for series-production. There is no need either for a pressure intensifier or for an additional pump, operating to the required output pressure-level. In addition, the elimination of such wear-susceptible components also increases the reliability of the propulsion control system in itself.

An advantageously simple construction of a magnetic or solenoid valve can be achieved according to other features in accordance with the present invention, by means of which the interconnection or switching of the pressure reservoir into the brake circuit of the driven vehicle-wheels and the coupling thereof to the return pump of the anti-blocking system for its recharge, can be controlled in a functionally appropriate manner.

The control signal required for triggering the magnetic or solenoid valve and for activating the return pump, can be derived in a simple manner, according to further features of the present invention, from the pressure build-up control signals, the pressure-holding control signals and the pressure-reduction control signals which are generated by the electronic control unit of the propulsion control system.

In connection with the generation of this control signal for activating the return pump, it is advantageous if the drop-off of this signal is delayed by a safety period Δt in order to ensure that, with the conclusion of an active control phase of the propulsion control system, the pressure reservoir is reliably recharged to the pressure level required for a subsequent control action.

According to still further features of the present invention, a simple arrangement can be realized which enables the pressure reservoir to be charged either by the driver or under automatic control, independently of the control phases of the propulsion control system.

The shutting-off of the brake-pressure regulating valves while the pressure reservoir is being charged, according to another feature of the present invention, prevents the occurrence of an undesirably high "consumption" of brake flud as a result of a simultaneous pressure application to the wheel brakes while the pressure reservoir is being charged.

A pressure-limiting valve, which is provided according to still another feature of the present invention and which is connected to the pressure reservoir, reliably prevents the high pressure reservoir from being charged to an impermissibly high pressure level, especially when it is being charged by operating the brake pedal.

According to still further features of the present invention, the hydraulic recharging circuit of the pressure reservoir is so constructed that the return pump of the anti-blocking system is utilized for charging the pressure reservoir also outside the control phases of the propulsion control system. It then suffices to use already light foot forces, if the pressure reservoir is being charged by operating the brake pedal, to bring the reservoir to the required pressure level, or if, according to another feature of the invention, a separate charging pump is provided for automatically charging the pressure reservoir, whose construction and control can be designed to have an advantageously low rating.

Since the return pump, which is conventionally constructed as a free-piston or floating-piston pump, develops no suction effect, and since brake fluid can flow from the brake-calipers into the operating-pressure chambers of the return pump—with the brake-pressure regulating valves in the return-flow positions—only as long as the pressure in the respective return-flow line exceeds the opening pressure of the non-return or check valves on the inlet side of the return pump, the pressure reservoir, without additional measures, would become progressively exhausted as the number of completed control-cycles of the propulsion control system increases.

A further arrangement according to the present inveiton, offers the major advantage, compared to the alternative embodiment described herein above, that no additional auxiliary feed pump is needed for recharging the pressure reservoir and, to this extent, additional expenditures for the propulsion control system, related to design and to production-engineering, are completely eliminated. At the same time, according to the present invention, the storage capacity of the brake-calipers is utilized, which, when conventionally dimensioned, receive in the course of a braking operation, a quantity of brake fluid, under the applied braking pressure, corresponding to several cubic centimeters, whereby this quantity of fluid can be utilized, to an adequate extent, for the necessary recharging of the pressure reservoir, by means of a functionally appropriate triggering of the brake-pressure regulating valves, of the return pump, and of the valve arrangement which effects the connection, in a manner permitting through-flow of the pressure reservoir to the return pump.

With the constructions of the installation according to the present invention, which utilize still further features and refinements thereof, pressure-reservoir charging cycles can take place both during the pressure build-up phase and the pressure-reduction phase of a braking action. According to other features of this invention, an acceptable imapriment of the braking effect can be kept sufficiently low by a pulse-controlled progress of the charging cycles, whereby a suitable pulse duty factor for the control pulses, in the sense of an optimum compromise, can be determined experimentally in a simple manner.

By limiting the possibility of initiating charging cycles to within a range of values of pressure in the brake master-cylinder bounded by a lower limiting pressure-value and an upper limiting pressure-value, which lies, for example, between 10 and 40 bar, on the one hand, an effective charging of the pressure reservoir is assured, while on the other hand, this limitation guarantees that the braking action cannot be impaired in the event of a full braking action which takes place with a high brake pressure, as a result of charging cycles which are interleaved into the braking phase.

Similar considerations also apply with regard to an embodiment of an installation according to the present invention, in which the charging of the pressure reservoir is initiated only during the final phase of the braking operation or during the final phase of the pressure-reduction in the brake circuit of the driven vehicle-wheels.

According to other features of this invention, a construction of the charging installation which includes a separate charging control valve, is particularly suitable for charging the pressure reservoir quickly and effectively, whereby it is possible to continue to build up brake pressure in the charging circuit of the pressure reservoir when the charging control valve is in its shut-off or closed condition, by way of a non-return or check valve located in a bypass flow-path, whereas brake fluid cannot flow back, from the charging circuit to the master brake cylinder.

In conjunction with this special configuration of the hydraulic charging circuit, the present invention proposes an electronic charging-control circuit which offers the advantage that the pressure-reduction in the brake-calipers of the brake circuit of the driven vehicle-wheels, caused by the charging of the reservoir, follows, in a good, step-wise approximation, the pressure-reduction in the master brake cylinder which is brought about by the driver as a result of his slow or rapid relaxation of pressure on the brake pedal.

In order to prevent that an undesirably rapid decrease in the braking effect results from the withdrawal of brake fluid from the brake-calipers, which is associated with the charging of the reservoir, it is advantageous if the charging cycles are time-wise separated by means of an output signal from a pulse-transmitter, which is expediently set, if the pulse duty factor of the charging control pulses is preset to a fixed value, in a manner such that in the majority of occurring braking situations, the response of the vehicle brakes matches the expectation, in this regard, of the drive actuating the brake.

With regard to the response-behavior of the brakes, the present invention also proposes a particularly advantageous embodiment of the charging control unit, by means of which the response-behavior of the vehicle brakes can be matched almost exactly to the actuating-behavior of the drive.

According to still other features of the present invention, a construction of a pressure-sensor device and of a pressure-comparison device is also possible, which is an alternative to the construction mentioned hereinabove, and which is distinguished by simple structure and high degree of operational reliability.

Particularly simple configurations of charging installations are possible also according to the present invention, if instead of analog-type pressure-transmitters, considerably less complicated pressure-switches and/or switching elements are used.

Furthermore, it can be advnatageous if pressure-reservoir recharging cycles can be initiated only within a defined vehicle-speed range, for example, between 10 km/h and 40 km/h, and/or within a defined braking deceleration range, for example between 0.1 g and 0.3 g.

Finally, a charging control unit of the propulsion control system is also possible according to the present invention which operates with a delay of the reservoir-charging operation, and which prevents that a reservoir charging cycle can take place while a braking maneuver is still in progress.

These and other objects, features and advantages of the present invention will become ore apparent from the following description whcn taken in conjunction with the accompanying drawing which shows, for purposes of illustration only, several embodiments in accordance with the present invention, and wherein:

FIG. 1 is a schematic view of a braking system of a motor vehicle equipped with an anti-blocking system and a propulsion control system combined therewith, and which includes an installation according to the present invention for charging a pressure reservoir which is provided with the scope of the auxiliary pressure-source of the propulsion control system, and FIGS. 2 and 3 illustrate schematically in block diagram two embodiments of a charging circuit according to the present invention, which is suitable for automatically charging the pressure reservoir of the installation according to FIG. 1;

FIGS. 5 to 7 are block diagrams of three embodiments of the present invention within the scope of the installation according to FIG. 4, of the electronic control unit which can be employed for the control of the charging of the pressure reservoir;

Figure 1:
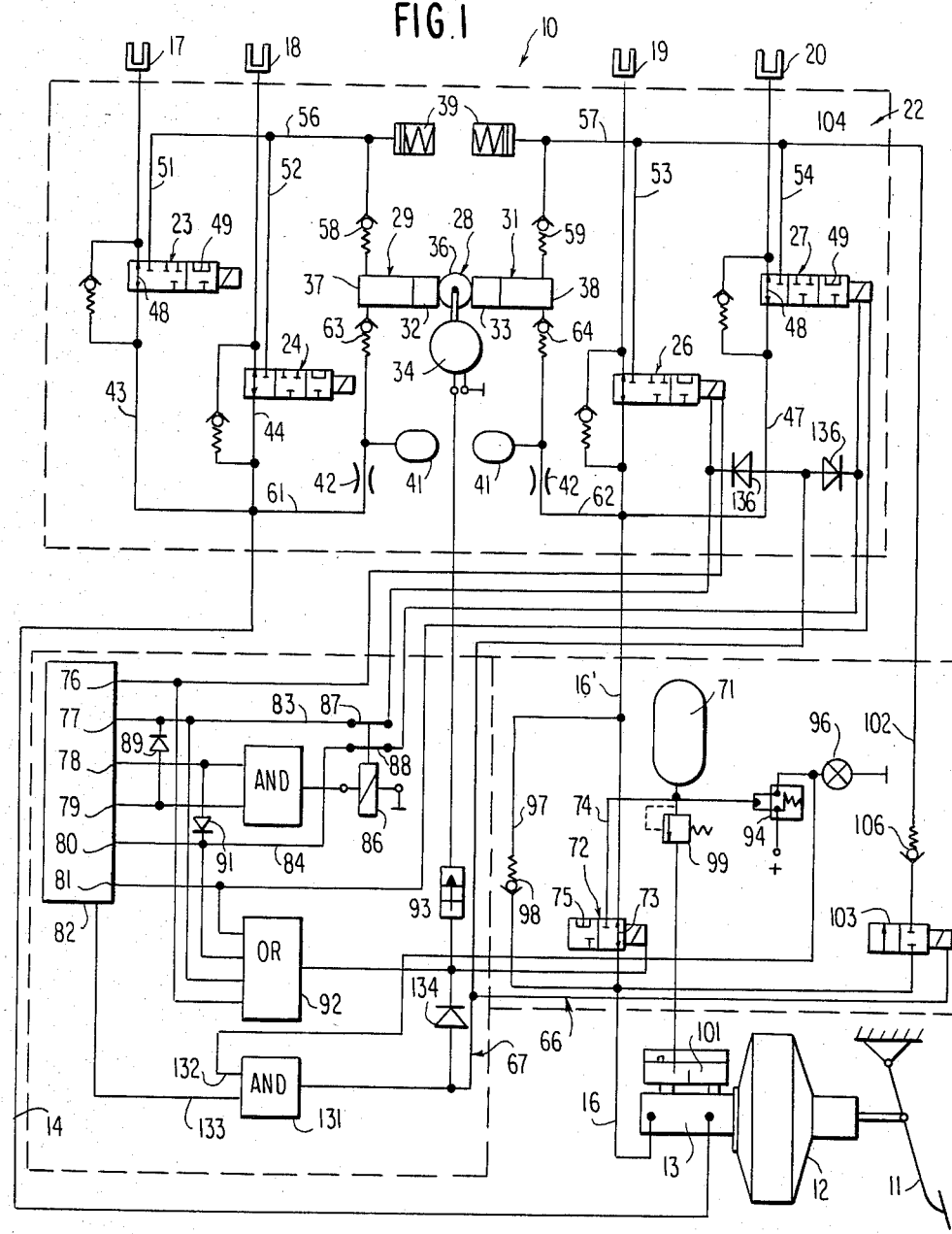

Referring now to the drawing wherein like reference numerals are used throughout the various views to designate like parts, and more particularly to FIG. 1, this Figure shows, without restricting its general nature, by reference to a motor vehicle with rear-wheel drive and a dual-crcuit braking system with braking power distribution between a front-axle brake circuit and a rear-axle brake circuit, a propulsion control system which is combined with an anti-blocking system; the propulsion control system thereby functions according to the principle of decelerating a driven wheel tending to spin while being driven, by applying pressure to its brake in a functionally appropriate manner, to the extent that a maximum value of the slippage Δ of this driven wheel, which is equally compatible with good driving stability and effective utilization of the propulsion torque, is either not exceeded or is exceeded only by an insignificant amount. The braking system, which is generally designated by reference numeral 10, includes a tandem master cylinder 13 actuatable by means of the brake pedal 11 by way of a vacuum operated brake-power booster 12, whereby the brake lines 14 and 16 are connected to the separate outlet pressure spaces thereof, by way of which the left-hand and right-hand wheel-brakes of the front-axle brake circuit and of the rear-axle brake circuit, which are represented by their brake-calipers, 17 and 18 and 19 and 21, respectively, are activated when the brake pedal is depressed.

The anti-blocking system, which is represented in FIG. 1 by its hydraulic adjusting element or servo unit generally designated by reference numeral 22 and shown in the upper portion of this Figure, is presumed to be a four-channel system of a type which in terms of its mode of operation and construction is known per se, and which operates on all four wheel-brakes, 17, 18, 29 and 21, with separate brake-force regulation. Within the scope of the anti-blocking system, each wheel is provided with a rotational speed sensor which generates an electrical output signal that is proportional both to the rotational speed of the wheel and to its peripheral velocity; each of the wheel-brakes, 17 and 18, 19 and 21, is also provided with an electrically shiftable brake-pressure regulating valve 23 and 24, respectively, 26 and 27, which are controllable corresponding to the different pressure build-up, pressure-holding and pressure-reduction phases of the anti-blocking control system, into their through-flow, shut-off and return-flow positions, respectively coordinated thereto. The functionally appropriate shifting control of the brake-pressure regulating valves 23 and 24 of the front-axle brake circuit and of the brake-pressure regulating valves 26 and 27 of the rear-axle brake circuit, in the sense of the anti-blocking control, is effected by means of an electronic control unit of any known type, not illustrated, which processes the output signals received from the wheel rotational speed sensors, to produce $\Delta$-signals that are characteristic of slippage $\Delta$ of the individual wheels, as well as $+b$-signals and $-b$-signals, which are characteristic of the accelerations or, as the case may be, of the decelerations of the individual wheels, and which generates, from a comparison of these signals with predetermined threshold values $\Delta_i$, $+b$ and $-b$, logic output signals and, from a logic operation on these signals, the pressure build-up signals, pressure-holding signals and pressure-reduction signals which are required for controlling the brake-pressure regulating valves in a functionally appropriate manner. In the foregoing, the index i of $\Delta_i$ refers to different threshold values of slip which may be compared with the $\Delta$-signals representing the slip of the individual wheels. The hydraulic servo unit 22 of the anti-blocking system further includes a return pump 28 which, during the pressure-reduction phases of the anti-blocking control, pumps pressure-medium—brake fluid—from the wheel-brake, 17, 18, 19 or 21, which, at the instant in question, is being controlled in the sense of a brake-pressure reduction, back into the brake line, 14 or 16 coordinated to this particular wheel-brake. In its turn, the return pump 28 includes a first free-piston or floating-piston pump 29, which is coordinated to the front-axle brake circuit, and a second free-piston or floating-piston pump 31, which is coordinated to the rear-axle brake curcuit, whose pistons 32 and 33 are actuatable in opposing senses, by means of an eccentric 36 which is driven by a controllable electric motor 34. Pressure-accumulators 39 of known function can be integrated by means of a known interconnection into the return pump 28 on its inlet side, as can also buffer-volumes 41 and restrictor or throttle elements 42, which are provided in the interest of noise-reduction.

In the normal position of the brake-pressure regulating valves, as illustrated in FIG. 1, the branch-lines 43 and 44, respectively 46 and 47, which start from the brake line 14 of the front-axle brake circuit and from the brake line 16 of the rear-axle brake circuit, are each connected to the coordinated wheel-brake, 17 or 18, respectively, 19 or 21, by way of the through-flow path 48 of the brake-pressure regulating valves. In the return-flow position of the brake-pressure regulating valves 23 and 24, respectively, 26 and 27, coordinated to the pressure-reduction phase, the wheel brake-cylinders of the front-axle brakes 17 and 18, and those of the rear-axle brakes 19 and 21, are connected to their respective return-flow line-branches, 51 and 52, respectively 53 and 54, by way of the return-flow path 49 of the respective brake-pressure regulating valve; the return-flow line-branches 51 and 52 terminate in a common return-flow lines 56 of the front-axle brake circuit, and the return-flow line-branches 53 and 54 terminate in a common return-flow line 57 of the rear-axle brake circuit, while the return-flow lines 56 and 57 are connected each by way of a respective non-return or check-valve 58 and 59 to the pressure-chamber 37 and 38 of the floating-piston pump 29 and 31, whereby non-return or check valves 58 and 59 are acted upon to operate in the through-flow direction by pressure in the return-flow lines 56 and 57, the floating-piston pumps 29 and 31 being coordinated to the front-axle and rear-axle brake circuits, respectively. The return lines 61 and 62 of the front-axle and rear-axle brake circuits, which lead from the pressure-chambers 37 and 38 of the floating-piston pumps 29 and 31 to the brake lines 14 and 16, are connected to the respective outlets of the floating-piston pumps 29 and 31 by way of non-return or check-valves 63 and 64, which are loaded to operate in the through-flow direction by increased pressure in the operating-pressure chambers 37 and 38 of the return pump 28.

The wheel rotational speed sensors (not shown) provided for the anti-blocking system and the functional elements thereof, which are provided for regulating the brake pressures at the brakes 19 and 21, i.e., the return pump 28, 31 and the brake-pressure regulating valves 26 and 27 of the rear-axle brake circuit, are utilized within the scope of the propulsion control system in a functionally analogous manner in order to regulate the brake pressures at the wheel-brakes 19 and 21 of the driven axle of the vehicle in a manner correct for the existing driving situation.

In addition thereto, the propulsion control system includes an auxiliary pressure-source generally designated by reference numeral 66 and shown in the lower right-hand portion of FIG. 1, from which pressure is applied during active control operating phases of the propulsion control system to the wheel-brake 19 and/or 21, which, at the instant in question, must be activated, as well as an electronic control unit generally designated by reference numeral 67 and illustrated in the lower left-hand portion of FIG. 1 in a highly simplified, diagrammatic representation, which produces the control signals required for the functionally appropriate control of the brake-pressure regulating valves 26 and 27 and for the connection of the auxiliary pressure-source 66 into the rear-axle brake circuit.

A pressure reservoir 71 is provided within the scope of the auxiliary pressure source 66 which can be charged to a pressure of approximately 160–200 bar, and which contains a supply of brake fluid, which is at this pressure and which is adequate for the pressure actuation of the wheel-brakes 19 and 21 of the driven vehicle-wheels, whereby the pressure reservoir 71 is designed with such a capacity that it does not exhaust itself in the course of auccessive control-cycles of the propulsion control system 66, 67. Furthermore, the auxiliary pressure-source 66 includes a magnetic valve generally designated by reference numeral 72 which, in the specific illustrated embodiment, is constructed as a 3/2-way valve; the solenoid valve 72 is adapted to be controlled by electrical energization from its normal illustrated position in which the brake line 16 of the rear-axle brake circuit is connected by way of the through-flow path 73 of the solenoid valve 72 to the hydraulic adjusting element or servo unit 22 of the anti-blocking system and in which the pressure reservoir 71 is shut-off with respect to this servo unit 22, into a bypassing position, in which the pressure reservoir 71 is connected by way of a pressure-line 74 and the bypass passage 75 of the magnetic valve 72 to the hydraulic servo unit 22, while instead the brake line 16 of the rear-axle brake circuit is shut off with respect to this hydraulic servo unit 22.

As a result of the construction, explained up to this point, of the auxiliary pressure-source 66 and of the hydraulic servo unit 22 of the anti-blocking system, there exists, as envisaged according to the present invention, the advantageous possibility of utilizing the free-piston or floating-piston pump 31 of the return pump 28 coordinated to the rear-axle brake circuit for recharging the pressure reservoir 71, that is, for maintaining its required operating pressure at least in the course of the pressure-reduction control phases of the propulstion control system 66, 67. In order to accomplish this, it is merely necessary that the return pump 28 of the anti-blocking system is activated at least during the pressure-reduction control phases of the propulsion control system and its return line 62 is closed off with respect to the tandem master cylinder 13 and instead is connected to the pressure reservoir 71 in a communicating manner permitting through-flow.

However, it is more advantageous, both for the propulsion control and for the effective recharging of the pressure reservoir 71, if the return pump 28 of the anti-blocking system is activated concurrently with the shifting over of the magnetic valve 72, as soon as the propulstion control system 66, 67 commences to operate, and also remain in operation throughout all directly successive control cycles thereof in order that the full delivery capacity of the return pump 28 is available, ab initio, during the pressure-reduction and reservoir-recharging phases of the propulsion control system. This requirement is met in the electronic control unit of the propulsion control system in that both the control signal which initiates the operation of the return pump and the control signal which effects the shifting over of the magnetic valve 72 into its bypassing position, are obtained from an OR-combination of all six pressure build-up, pressure-holding and pressure-reduction control signals, which are produced as high-level (level "one") output signals at the output terminals 76–81 of a processing stage 82 which produces by appropriate processing of the output signals from the wheel rotational speed sensors, in a sequence and combination appropriate to the control, at its output terminals 78 and 79, the pressure build-up signals, at its output terminals 77 and 80 the pressure-holding signals, and at its output terminals 76 and 81 the pressure-reduction signals, by means of which it is possible to initiate control of the two brake-pressure regulating valves 26 and 27 of the rear-axle brake circuit. The brake-pressure regulating valve 27 or 26, as the case may be, belonging to the rear wheel which is not tending to spin, is controlled into its shut-off or closing position by means of the output signals produced at the output terminals 78 and 79, which are intended to initiate a pressure build-up in the left-hand rear-wheel brake 19 respectively in the right-hand rear-wheel brake 21. The pressure build-up signals are transmitted to the brake-pressure regulating valves 26 and 27 by way of the same signal lines 83 and 84, by way of which the pressure-holding control signals produced at the output terminals 77 and 80 of the processing stage 82 are also transmitted to the brake-pressure regulating valves 26 and 27. In order to prevent both brake-pressure regulating valves 26 and 27 from being controlled into their shut-off or closing position in the event of the simultaneous presence of pressure build-up signals at the output terminals 78 and 79 of the processing stage 82, that is when a pressure build-up has to take place in the wheel-brakes 19 and 21 by way of both brake-pressure regulating valves 26 and 27, a further signal is derived from an AND-combination of these two signals, by means of which, for example, a relay 86 is controllable, whereby the signal lines 83 and 84 are controlled by way of the operating contacts of this relay, constructed as opening-contacts 87 and 88, and are interrupted whenever the relay 86 is energized, as a result of which the two brake-pressure valves 26 and 27 drop off into their normal position required for the pressure build-up phase. In order to prevent that this occurs also when a pressure-holding signal is present at each of the output terminals 77 and 80 of the processing stage 82, the output terminals 77 and 79 are mutually decoupled by the blocking diode 89, while the output terminals 78 and 80 are mutually decoupled by the blocking diode 91.

The control of the solenoid valve 72 of the auxiliary pressure-source 66 as well as of the return pump 28 of the anti-blocking system is initiated by the output signal from the OR-logic element 92, which is present as long as a control output-signal is present at any one of the output terminans 76-81 of the processing stage 82, that is as long as the propulsion control system is activated, whence the return pump 28 operates throughout all the control phases of the propulsion control system 66, 67. It is thereby advantageous if the disappearance of the signal activating the return pump 28 is delayed by means of the time-delay element 93 by a safety period Δt relative to the decaying of the last of the output signals from the processing stage 82 to disappear; it is achieved thereby that the return pump 28 continues to operate for a short period of time following the termination, for example, of a pressure-reduction signal which concludes the control cycle, and that the pressure reservoir 71 is reliably recharged to the minimum pressure required for a subsequent control phase.

As long as the reservoir and the hydraulic components of the propulsion control system and of the anti-blocking system, which are connected to this reservoir, are absolutely tight and free of leakage losses, the pressure reservoir 71 will be recharged to its required pressure in the course of the operation of the propulsion control system.

Since, however, leakage losses repeatedly occur in practice, and/or in case or repair, the pressure may have dropped to a value below the required value which should be maintained, it is necessary that the pressure reservoir 71 is adapted to be recharged either by an action on the part of the drive or by automatic means. For this purpose, the following measures are provided either alternatively or in combination:

If the pressure in the reservoir 71 falls below a preset minimum value of the required or intended pressure, a pressure-switch 94 produces an electric signal, by means of which the drive is advised, for example by the lighting-up of a warning light 96, that the propulsion control system is not operationally ready and that the reservoir 71 must be charged. As long as the fault-indication signal is present with a closed pressure switch 94 and the vehicle stands still—this condition can be monitored, for example, with the aid of the output signals from the wheel rotational speed sensors—the magnetic valve 72 can be switched over into its bypassing position, or, if the two above-mentioned conditions are satisfied, it is automatically shifted over into this bypassing position. In this bypassing position the pressure reservoir 71 is then connected to the rear-axle outlet pressure-chamber of the tandem master cylinder 13 by way of the bypass path 75 of the magnetic valve 72 and by way of a short-circuiting line 97, whereby a check valve 98 is provided in this short-circuiting line 97 which is acted upon in the through-flow direction by a pressure increase in the tandem master brake cylinder 13. With the vehicle stationary, the driver can now charge the pressure reservoir 71 to its required pressure by vigorously operating the brake pedal 11, by way of the short-circuiting line 97, whereby the pressure-switch 94 reopens and the warning light 96 extinguishes again when the required pressure is reached. The magnetic valve 72 must then be switched over into its normal position, unless it automatically drops back into this position.

In order to avoid an overcharging of the pressure reservoir 71, a pressure-limiting valve 99 is connected thereto, by way of which brake fluid can flow off from the pressure reservoir 71 into the supply reservoir 101 of the tandem master cylinder 13.

In order to prevent that during a reservoir-charging operation as explained above, an excessive amount of brake fluid is consumed in the rear-axle brake circuit as a result of simultaneous application of pressure to the rear-axle brakes 19 and 21, it is additionally provided that with the shifting over of the magnetic valve 72 for the purpose of charging the pressure reservoir 71, the brake-pressure regulating valves 26 and 27 are simultaneously also brought into their shut-off or closing position. In such a case the vehicle can nonetheless be held stationary in a reliable manner by actuation of the brake as a result of the non-impaired action of the front-axle brakes 17 and 18.

Charging of the pressure reservoir 71, independent of the control-cycles of the propulsion control system 66, 67, can also be effected by way of a brake-fluid flow-path generally designated by reference numeral 102, instead of by way of the bypass line 97; the flow-path 102 branches off from the brake line 16 of the rear-axle brake circuit between the tandem master cylinder 13 and the magnetic valve 72 and terminates in the common return-flow line 57 of the brake-pressure regulating valves 26 and 27, which leads by way of the non-return or check valve 59 to the pressure-chamber 38 of that floating-piston pump 31 of the return pump 28 of the anti-blocking system which is coordinated to the rear-axle brake circuit. This flow-path 102 can be opened by an electric control of a 2/2-way magnetic or solenoid valve 103, whose normal position is the shut-off or closed position. A non-return or check valve 106 is provided between this further magnetic valve 103 and the point of discharge 104 of the flow-path 102 into the return-flow line 57 of the return pump 28, on the rear-axle side, whereby the check valve 106 is acted upon in the through-flow direction by the pressure generated in the tandem master cylinder 13. when the magnetic valve 103 is in its energized condition corresponding to its through-flow position. With this construction of the circuit for charging the pressure reservoir 71, the magnetic valves 72 and 103 are—once again with the vehicle stationary and the pressure-switch 94 closed—simultaneously shifted into their bypassing respectively through-flow positions, and the return pump 28 of the anti-blocking system 22 is activated. In this case—as during the pressure-reduction phases of the propulsion control system—the pressure reservoir 71 is charged with assistance from the return pump 28 of the anti-blocking system, whereby the pedal force to be applied by the driver must merely be sufficient to overcome the through-flow resistance of the check valves 106 and 59. This construction of the pressure-reservoir recharging circuit is particularly suitable for heavy vehicles, in which peak brake-pressure values of 180-200 bar are needed in the wheel brake-cylinders, which presupposes a corresponding charging-capability of the pressure reservoir 71, which however, can be achieved without difficulty with the assistance of the return pump 28.

In order to be able to charge the pressure reservoir 71, the magnetic valve 72 must be shifted into its bypassing position and the magnetic valve 103 must be switched into its through-flow position as mentioned above. The output signal from a dual-input AND-element 131 is used as control signal for this purpose; the AND-element 131 receives at one of its inputs 132 the output signal from the pressure-switch 94 and its other input 133, and output signal of the processing stage 82, indicating that the vehicle is stationary, i.e., stands still. The output signal from the AND-element 131 is also used to activate the return pump 28 and to shift the brake-pressure pressure regulating valves 26 and 27 into their shut-off or closing position. The outputs of the AND-element 131 and of the 4-input OR-element 92 must be mutually decoupled, as indicated by a blocking diode 134. In the same way, the output signal-lines 83 and 84 of the processing stage 82 must be decoupled with respect to the output from the AND-element 131, for example, by means of the blocking diodes 136.

Figure 3:
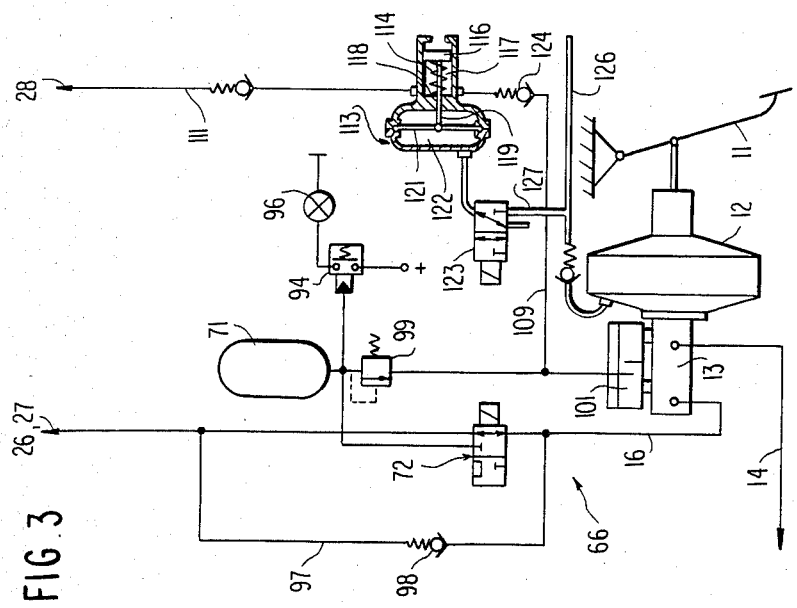
Figure 2:
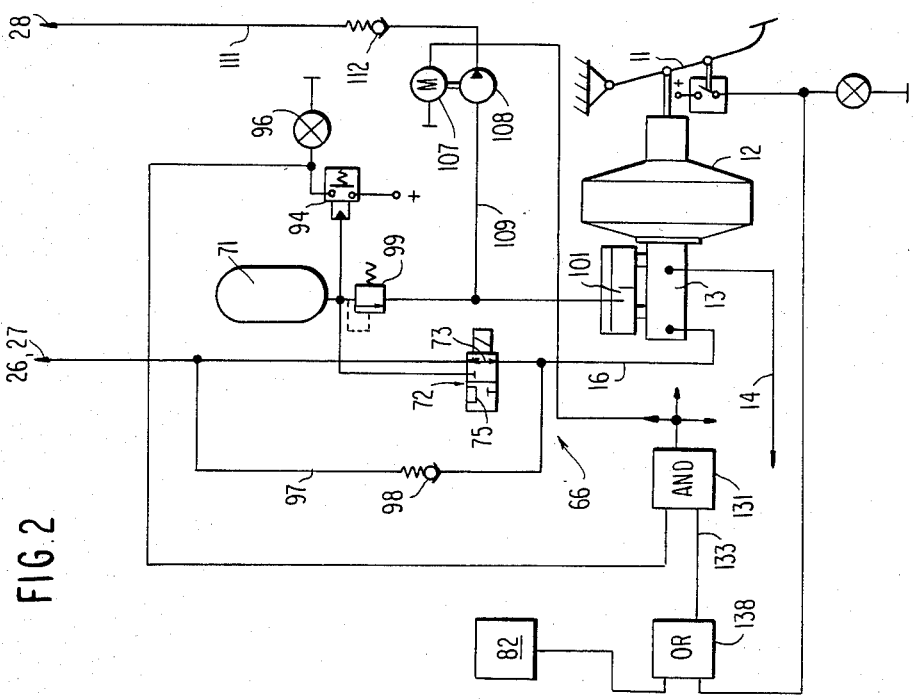

FIGS. 2 and 3 illustrate two embodiments of the auxiliary pressure-source again generally designated by reference numeral 66 of the recharging circuit of the pressure reservoir 71, which enable an automatic charging of the pressure reservoir 71, whenever the pressure in this reservoir has fallen beneath a minimum required or intended value. In FIGS. 2 and 3, elements which are identical to functional elements of the auxiliary pressure-source 66 according to FIG. 1, or elements which hve similar functions, are designated by corresponding reference numerals.

The auxiliary pressure-source 66 qccording to FIG. 2 includes a pump 108 driven by an electric motor 107, which draws in brake fluid from the supply reservoir 101 of the tandem master brake cylinder 13 by way of its suction 109, and forces this brake fluid towards the return pump 29 of the anti-blocking system 22 by way of its outlet pressure-line 111, in which is arranged a non-return or check valve 112 in the through-flow direction by the output pressure of the pump 108, whereby the return pump is thus once again involved in the charging of the pressure reservoir 71 in a manner analogous to the procedure which has already been described. The recharging of the pressure reservoir 71, in accordance with the prevailing demand, is controlled as follows:

If—when the pressure-switch 94 is closed—the indicating signal is present to the effect that the pressure in the pressure reservoir 71 is too low, and at the same time an indicating signal is present to the effect that the vehicle stands still or is in an unbraked state of motion, the magnetic valve 72 and the brake-pressure regulating valves 26 and 27 of the rear-axle brake circuit are simultaneously shifted into their bypassing and shut-off position, respectively, and the pump 108 of the auxiliary pressure-source 66 as also the return pump 28 of the anti-blocking system 22 are also activated.

The output signal from a dual-input OR-element 138 which receives at its negated input, the output signal from the brake-light switch and at its non-negated input, receives the signal from the processing stage 82, indicating that the vehicle is stationary, is then supplied to the input 133 of the AND-element 131, whose output signal can be utilized in a manner analogous to that described by reference to FIG. 1.

As a result thereof, the pressure reservoir 71 is charged up to the required or intended pressure, that is, up to a maximum value of approximately 200 bar, until the pressure-switch 94 opens again, thereby terminating the charging operation. The signal for indicating that the vehicle is stationary, i.e. stands still, can be obtained, for example, by evaluating the output signals from the rotational speed sensors which monitor the state of motion of the vehicle-wheels. The absence of a signal from the brake-light switch, for example, can be utlized as an indication of the fact that the vehicle is in unbraked state of motion. The pump 108, and its drive motor 107, provided within the scope of the auxiliary pressure-source 66 according to FIG. 2, can be constructed to be comparatively small and inexpensive, since the pump 108 merely has to be capable of overcoming the pressure amounting altogether to about 6–7 bar which is required to open the non-return valves 112 and 59 that are located on the charging circuit.

The auxiliary pressure-source 66, shown in FIG. 3, differs from that according to FIG. 2 merely by the special construction of the pump generally designated by reference numeral 113 displacing the brake fluid from the supply reservoir 101 towards the return pump 28 of the anti-blocking system 22, which is constructed in this case as a simple valve-controlled suction-drive piston pump. The piston 116 which delimits the operating chamber 114 of this pump 113 on one side, is supported by way of a return spring 117 against that boundary wall 118 of the operating chamber 114 which faces the piston. A plunger 119 is mounted centrally and in a leakproof manner within this wall 118, which connects the piston 116 to a diaphragm 121, which, in its turn, forms the movable boundary of a pump actuating-chamber 122 that can be connected to a suction source available on the vehicle. A 3/2-way magnetic valve generally designated by reference numeral 123 is provided for controlling the piston pump 113, the chamber 122 of the pump 113 being vented to the atmosphere and the diaphragm 121 being unstressed when this magnetic valve 123 is in its normal position as shown. In this position, the piston 116 has executed its suction stroke under the action of the return spring 117 and has drawn-in brake fluid from the supply reservoir 101 of the tandem master cylinder 13, by way of the suction line 109 and the check valve 124 so that the operating—chamber 114 of the pump 113 is filled with brake fluid. If, in order to initiate the operation of charging the pressure reservoir 71, the magnetic valve 72 is shifted, the pump control valve 123 is also simultaneously shifted into its through-flow position, in which the pump chamber 122 is connected in a communicating manner to the suction source on the vehicle. The piston 116 then executes its working stroke forcing its brake fluid towards the return pump 28 of the anti-blocking system 22. The piston pump 113 is so dimensioned that a single piston-stroke forces a quantity of brake fluid sufficient for charging the pressure reservoir 71 towards the return pump 28. In the case of the illustrated embodiment, the suction source which also effects the application of suction to the brake-power booster 12, is used as the suction source for this piston pump 113. If the vehicle is one in which the brake-power booster is connected by way of a suction line 126 to the engine intake pipe or to a suction pump, then in the through-flow position of the control valve 123 the pump-chamber 122 is also connected to this suction line 126, in a manner permitting through-flow by way of the connecting branch 127.

Figure 4:
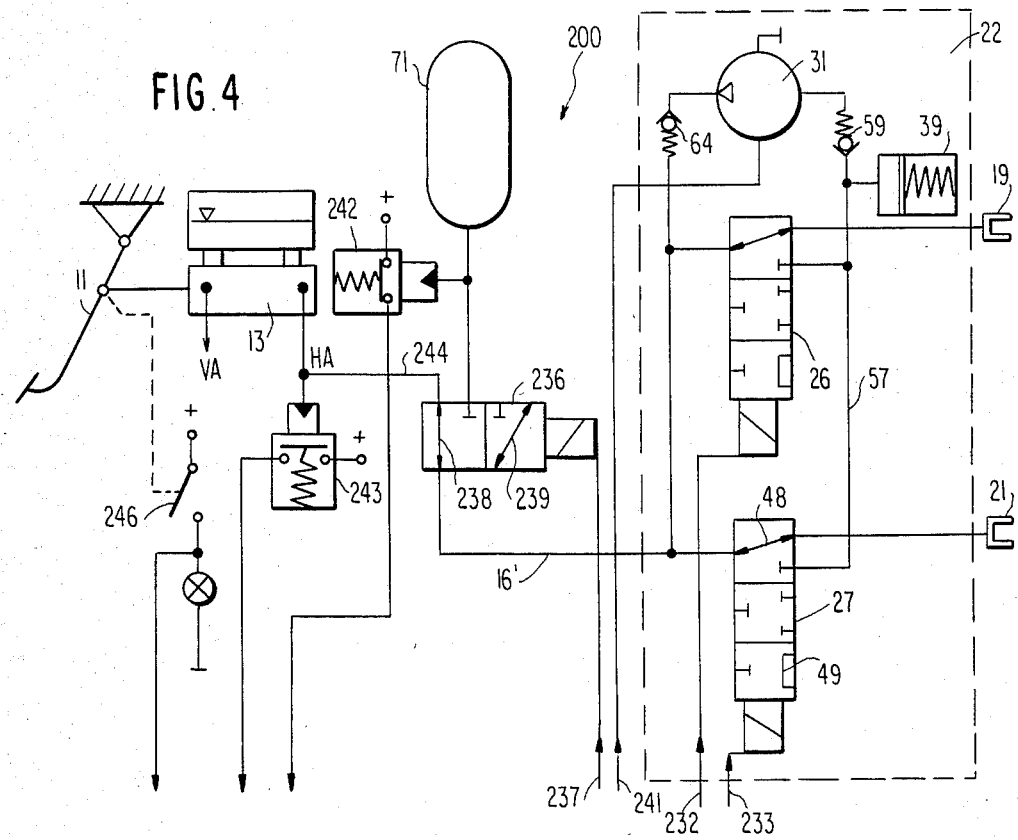
FIG. 4 illustrates schematically and in block diagram a further embodiment of an installation according to the present invention, for charging a pressure reservoir which is employed as an auxiliary pressure-source within the scope of a propulsion control system of a motor vehicle.

FIG. 4 shows, in a simplified circuit diagram, the hydraulic functional section of a propulstion control system generally designated by reference numeral 200 for a motor vehicle which is equipped with an anti-blocking system (ABS) which corresponds, with regard to its construction and mode of operation, to the anti-blocking system according to FIG. 1. The same reference numerals as in FIG. 1 are accordingly used for elements having corresponding functions.

In FIG. 4, the anti-blocking system is represented merely by that portion of its hydraulic adjusting device or servo unit 31 coordinated to the rear-axle brake circuit. In the normal postion of the brake-pressure regulating valves 26 and 27, as shown, brake pressure can be built-up in the brake-calipers 19 and 21, for example by operating the tandem master cylinder 13 by means of the brake pedal 11, or by a valve controlled connection of the pressure reservoir 71 provided within the scope of the propulsion control system 200 as an auxiliary pressure-source, to the brake line 16'. The brake-pressure regulating valves 26 and 27, which are constructed as 3/3-way magnetic valves, can be shifted into a shut-off position by 3A control signals, and into a return-flow position by 6A control signals, which can be supplied to their control-solenoids by way of the electrical control lines 232 and 233 respectively.

The control signals appropriate for the regulation of the brake pressure in the sense of the anti-blocking control or of the propulsion control, are generated by conventional electronic control units (not shown) of the anti-blocking system and/or of the propulsion control system 200, in the sequence and combination appropriate for the respective control purpose.

A more detailed discussion of the propulsion control system 200, and of the installation provided for charging the pressure reservoir 71 employed as an auxiliary pressure-source follows hereinafter by reference to FIG. 4 and to FIGS. 5–7.

The pressure reservoir 71 is dimensioned in such a way that it does not completely exhaust itself in the course of successive control-cycles of the propulsion control system 200.

In the specific illustrated embodiment shown in FIG. 4, a change-over or shifting valve constructed as a 3/2-way magnetic valve 236 is provided for coupling the pressure reservoir 71, in a manner appropriate to the control, to the brake circuit 19, 21, 16' of the driven vehicle-wheels. The change-over valve 236 is adapted to shifted by electric control way of its control line 237 from its illustrated normal position, in which the pressure reservoir 71 is shut-off with respect to the brake line 16' while the latter is connected by way of the first through-flow path 238 of the change-over valve 236 with the coordinated outlet pressure-chamber of the tandem master cylinder 13, into its second through-flow position, in which the pressure reservoir 71 is now connected by way of the second through-flow path 239 of the change-over valve 236 to the brake line 16', while the outlet pressure-chamber of the tandem master cylinder 13 is shut-off or closed with respect to the brake line 16'. At least during the pressure-reduction control phases of the propulsion control system, the return pump 31 is activated by an output signal of its electronic control unit by way of the control line 241; the pump thus pumps back brake fluid during the pressure-reduction phases, from the brake-caliper 19 and/or 21, in which the pressure-reduction is taking place at the instant in question, into the pressure reservoir 71 by way of the brake line 16' and the second through-flow path 239 of the change-over valve 236, thereby recharging the reservoir.

Since, as mentioned above, the pressure reservoir 71 can still be exhausted notwithstanding the far-reaching recharging in the course of the pressure-reduction phases, it must be capable of being recharged, at least from time to time, independently of the control-cycles of the propulsion control system 200. In one embodiment an installation which is suitable for recharging the pressure reservoir 71 in a manner appropriate to the demand, includes a first pressure-switch 242, which monitors the pressure in the pressure reservoir 71 and produces a high-level (level "one") output signal as soon as the pressure falls below a minimum required value of, for example, 60 bar. A second pressure switch 243 monitors the pressure in that section 244 of the brake line 16' which leads from the tandem master cylinder 13 to the change-over valve 236, and produces a high-level (level "one") output signal as soon as this pressure increases above a predetermined threshold value of, for example, 20 bar.

Figure 5:
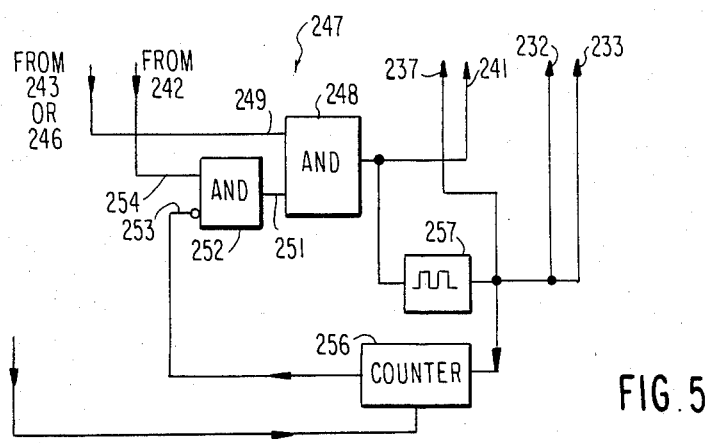

An electronic control unit generally designated by reference numeral 247, which by processing the output signals from the two pressure-switches 242 and 243, and possibly the response output signal from the brake-light switch 246, produces control signals for the change-over valve 236, the brake-pressure regulating valves 26 and 27, and the return pump 31, for the purpose of recharging the pressure reservoir 71 in a manner appropriate to the demand, has the construction shown in FIG. 5.

A dual-input AND-element 248 receives at one of its inputs, the output signal from the second pressure-switch 243, or, as the case may be, the response output signal from the brake-light switch 246, which indicate that the driver's brake is activated. At its other input 251, the dual-input AND-element 248 receives the output signal from a further dual-input AND-element 252, inserted as a blocking element, which has a negated input 235 and a non-negated input 254. At the non-negated input 254, this second AND-element 252 receives the output signal from the first pressure-switch 242. As long as a high-level (level "one") output signal is present at the negated input 253 of the second AND-element 252, which is the case only when a charging-cycle counter 256 has reached a preset final count-level, the output signal from the second AND-element 252 is a high-level "one") signal and hence also the output signal from the first AND-element 248, if the high-level (level "one") output signal from the second pressure-switch 243 is simultaneously present at the first input 249 of this first AND-element 248. The return pump 31 of the hydraulic adjusting device or servo unit 22 of the propulsion control and/or anti-blocking system is activated by the high-level output signal from the first AND-element 248, which thus results from the AND-linkage of the output signals from the two pressure-switches 242 and 243.

The output signal from the first AND-element 248 is employed to excite a pulse-generator 257, which generates high-level output pulses of predetermined frequency and predetermined pulse duty factor. The brake-pressure regulating valves 26 and 27 are controlled into their return-flow positions by means of the output pulses of the pulse generator 257 and the change-over or shifting valve 236 is energized. Triggered by an actuation of the driver's brake and by the signal indicating that the pressure in the pressure reservoir is too low, the propulsion control system 200 is thus periodically controlled into pressure-reduction phases, in the course of which brake fluid is conducted by means of the return pump 31 from the brake-calipers 19 and 21 into the pressure reservoir 71 and the latter is charged up to its required or intended pressure-value. Use is thereby made of the fact that during the braking-phases, which are interleaved timewise between the pressure-reduction respectively charging phases, during which the pressure is built-up in the brake-calipers 19 and 21, the latter receive a considerable amount of brake fluid, which is subject to this brake pressure, in practice several cubic centimeters, and thus act, in their turn, as pressure reservoirs, whose pressure-level is sufficiently high to overcome the opening pressure of the check valve 59 on the inlet side of the return pump 31 and to give off to the return pump an amount of brake fluid which suffices for the effective charging of the pressure reservoir 71.

The sequence of charging cycles, initiated by the control unit 247, is terminated when either the disappearance of the output signal from the first pressure-switch 242 indicates that the reservoir 231 is charged and/or the brake-application is terminated, as indicated by the disappearance of the output signal from the second pressure-switch 243 or the disappearance of the output signal from the brake-light switch, or when the charging cycle counter 256, which counts the output pulses from the pulse-generator 257, reaches its final count-level, thereupon produces a high-level (level "one") output signal which leads to a disappearance of the output signal from the second AND-element 252 and therewith also to the disappearance of the output signal from the first AND-element 248 and as a consequence thereof to the switching-off of the return pump 31. The cycle-counter 256 can be reset by the response signal of the brake-light switch 246, so that the same final counter-level of the cycle-counter 256 determines the termination of all the charging-cycle sequences initiated by an operation of the driver's brake, provided the charging cycles have not already been terminated earlier by the disappearance of the output signals from the pressure-switch.

With the control of the charging-cycles explained hereinabove, a typical value of the pulse duty factor of the pulses of the pulse-generator 257, which trigger the charging-phases and the braking-phases, is 1:2 whereby the charging-interval is approximately 0.2 sec. and therewith also the braking-interval. However, it is understood that the optimum selections of this pulse duty factor can be determined, for different types of vehicle, by specific tests.

With the control of the charging-cycles described so far, the charging cycles can take place both within the pressure build-up phase as also within the pressure-reduction phase of a braking operation. In such cases, a certain, even if slight, reduction in the braking effect must be accepted. In order to ensure in critical driving situations, in which a high brake pressure is required, for example in the event of a so-called full braking, i.e., maximum brake-application, that charging cycles cannot impair the braking effect, provisions are made according to the present invention that reservoir-charging cycles can no longer be initiated at brake pressures in excess of, for example, 60 bar.

This can be achieved by means of a special construction of the pressure-switch 243, which monitors the pressure in the tandem master cylinder 13, in such a manner that this pressure-switch produces a first output signal when a brake pressure of, for example, 10 bar is reached, whereby the presence of this signal is used as a condition that reservoir-charging cycles can take place, and that this pressure-switch 243 generates a second signal when the pressure in the tandem master cylinder exceeds, for example, 40 bar, and the presence of this signal is used as a condition for the fact that the reservoir-charging cycles can no longer take place. Another suitable possibility may also consist in providing a third pressure-switch, which, at the upper threshold value of 40 bar, produces a corresponding signal preventing charging cycles from taking place. A pressure-switch, suitable for the purpose described, could also be constructed in a manner such that it produces a high-level (level "one") output signal only within the range between approximately 10 bar and approximately 40 bar, as a condition for the fact that reservoir-charging cycles can take place.

A further electronic control unit generally designated by reference numeral 258, suitable for the control of the charging of the pressure reservoir 71, is illustrated in FIG. 6. This unit includes a dual-input AND-element 259, which receives, as input signals, the output signals from the two pressure-switches 242 and 243 of the propulsion control system 200 according to FIG. 4. A differentiating element 261 is series-connected with the AND-element 259, this differentiating element is then series-connected to a diode 262 polarized in the forward direction with respect to negative output signals, and the diode 262 in turn is series-connected to a decay-delayed timing element 263. The change-over valve 236 is shifted by means of the output signal of the timing element 263 into its position connecting the pressure reservoir 71 thereof to the brake line 16', the brake-pressure regulating valves 26 and 27 are shifted thereby into their return-flow positions and simultaneously therewith the return pump 31 is activated thereby. Since, in the case of the construction of the control unit 258 illustrated in FIG. 6, the timing element 263 is triggered by the decaying flank or trailing edge of the high-level output signal from the pressure-switch 243, the charging operation of the reservoir 71 is initiated only within the final phase of the pressure-reduction in the tandem master cylinder 13, that is, after the driver has virtually completely withdrawn his foot-force from the brake pedal, and the braking operation is at the same time terminated. The charging operation is terminated after the period which is defined by the delay-time of the timing element 263. Typical values of this time interval lie between 0.2 and 0.5 sec.

In order to prevent that repeated pressure reservoir recharging cycles are initiated, following the first disappearance of the output signal of the pressure-switch 243, monitoring the pressure in the tandem master cylinder 13, by an actuation of the driver's brake with a moderate pedal-force, which leads to a pressure build-up in the tandem master cylinder within the 10-bar range, it is expedient if following the first disappearance of the output signal from the pressure-switch 243, a limitation of the number of charging cycles which may possibly follow is again undertaken. A control unit generally designated by reference numeral 265 is suitable for this purpose, is represented in FIG. 7. Its construction essentially corresponds to that of the control unit 258 according to FIG. 6, however, it additionally includes a cycle-counter 264 and an AND-element 266 with a negated input 267, at which the final counter level signal from the cycle-counter 264 is received. At tis other input 268, the AND-element 266 receives the output signal from the second pressure-switch 243. The output of the AND-element 266 is connected to the second input of the AND-element 259. Once again, the cycle-counter 264 can be reset by the response signal from the brake-light switch.

Figure 8:
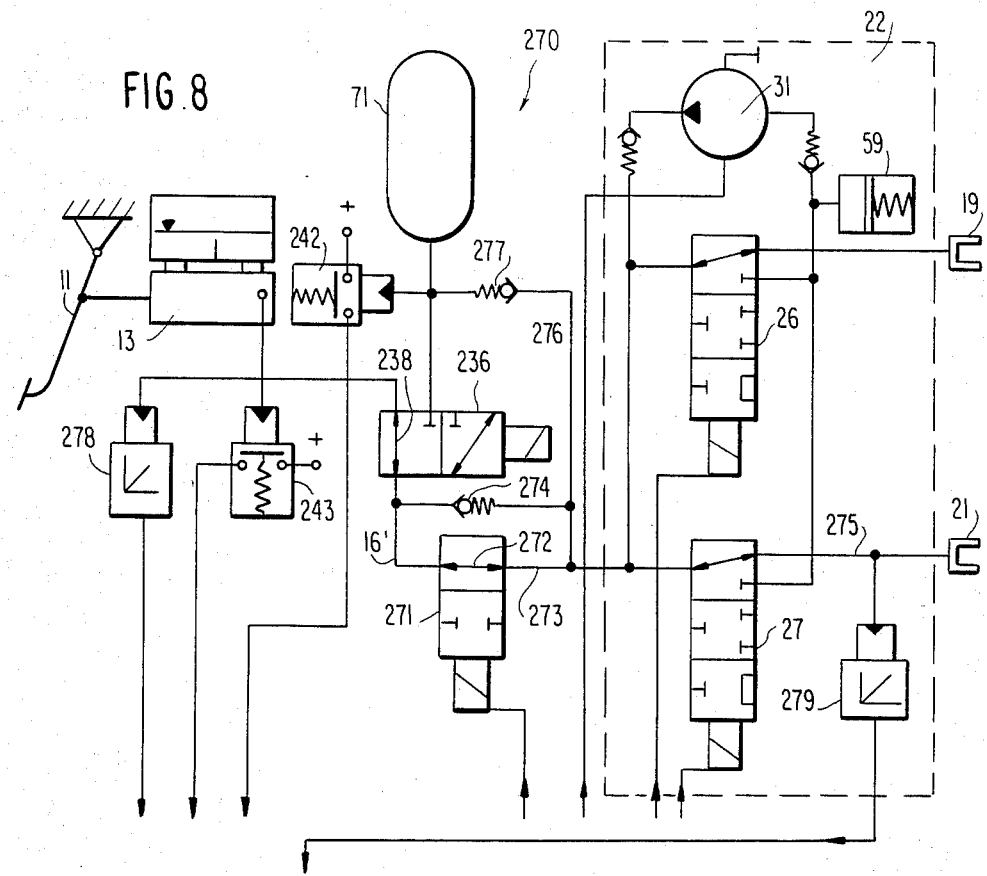
FIG. 8 illustrates schematically and in block diagram a further embodiment of a pressure-reservoir charging installation according to the present invention, in a representation similar to that shown in FIG. 4.

The propulsion control system generally designated by reference numeral 270 shown in FIG. 8, far-reachingly corresponds in its construction to the system according to FIG. 4. Accordingly, constructionally and functionally similar elements are designated by the same reference numerals.

In contrast to the system 200 according to FIG. 4, the system 270 according to FIG. 8, includes an additional shut-off valve 271, constructed as a charging control valve which is a 2/2-way magnetic valve. In the propulsion control system 270, the change-over valve 236 is used only for coupling the pressure reservoir 71 to the hydraulic servo unit 22 of the propulsion control system, in a manner appropriate to the control function.

In the normal position of the two valves 236 and 271, as illustrated, the tandem master cylinder 13 is connected by way of the first through-flow path 238 of the change-over valve 236 and the through-flow path 272 of the shut-off valve 271, to that section 273 of the brake line again generally designated by reference numeral 16', which leads on to the brake-pressure regulating valves 26 and 27. A non-return or check valve 274 is connected in parallel by-passing relationship to the shut-off valve 271, which is acted upon in the closing direction when the pressure in the continuing section 273 of the brake line 16' exceeds the pressure in the branch thereof leading to the shut-off valve 271. The charging line 276 leading to the pressure reservoir 71 branches from the continuing section 273 of the brake line 16'; a non-return or check valve 277 which is acted upon in the opening direction when the pressure in the charging line 276 exceeds that in the pressure reservoir 71 is located in the charging line 276.

In further contrast to the embodiment according to FIG. 4, a pressure-transmitter or transducer 278 is provided, in addition to the pressure-switch 243 monitoring the outlet pressure of the tandem master cylinder 13; the pressure transducer 278 produces an output signal which is proportional to the pressure in the tandem master cylinder 13. A second pressure-transmitter or transducer 279 is connected to one of the two pressure-lines leading to the brake-calipers 19 or 21, for example, to the pressure-line 275, whereby the pressure-transducer 279 also produces an output signal which is proportional to the pressure.

Figure 9:
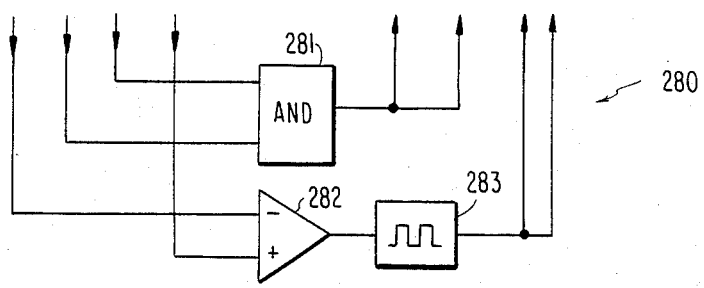
FIG. 9 is a block diagram of a control unit according to the present invention which is suitable for controlling the charging of the pressure reservoir of the installation according to FIG. 8.

The electronic control unit generally designated by reference numeral 280 which is provided in conjunction with the propulsion control system 270 for controlling the charging of the pressure reservoir 71, is illustrated in FIG. 9.

The control circuit 280 includes a dual-input AND-element 281, which receives, as input signals, the output signal from the first pressure-switch 242 monitoring the pressure in the pressure reservoir 71 and the output signal from the second pressure-switch 243. The charging control valve 271 is shifted to its shut-off position by the high-level (level "one") output signal from the AND-element 281. The output signals from the two pressure-transmitters or transducers 278 and 279 are continuously compared with each other by means of a comparator 282. In the event these two output signals respectively the pressures in the brake line 16' and in the pressure-line 279 of the monitored brake-caliper 21 become unequal, the output signal from this comparator 282 is also a high-level (level "one") signal, by means of which the brake-pressure regulating valves are adapted to be controllingly shifted into their return-flow positions, in which the return pump 31 charges the pressure reservoir 71 by way of the charging line 276 and the non-return or check valve 277.

When the charging control valve 271 has been shifted into its shut-off position, brake pressure can be built-up by way of the non-return or check valve 274, which is connected in parallel bypassing relationship thereto, however brake fluid cannot flow back to the tandem master cylinder 13. In other words, this means again that for the particular recharging cycles in question, the pressure respectively supply of brake fluid stored in the brake-calipers 19 and 21, and in those parts of the hydraulic unit which communicate with the brake-calipers, is fully available for recharging the pressure reservoir 71.

The comparator 282 provides a continuous pressure-comparison as a result of which the pressure-decay in the course of the recharging cycles is approximately matched in a stepwise manner to the pressure-decay occurring during a normal brake-application in the manner of a braking step-function. However, it is thereby possible that the pressure drop is so pronounced, for example during the first recharging cycle, that the braking effect at the rear-axle is abruptly reduced.

In order to provide a remedy for this problem, it is appropriate if a pulse-generator 283, for example, an astable multivibrator, is triggered by the output signal from the comparator 282, whereby the multivibrator 283 controls the recharging cycles by means of its high-level (level "one") output signal produced at a defined pulse-repetition frequency. It is thereby also appropriate if the pulse duty factor of the output signal from the pulse-generator is proportional to the output voltage of the comparator 282, which in its turn, is proportional to the monitored pressure-difference. A curve for the pressure decay is attained by the pulsed control of the brake-pressure regulating valves 26 and 27 by means of the pulse-generator 283 having a controllable pulse duty factor which corresponds to the best possible approximation of the decay subjectively expected by the driver, whereby the pressure decay occurs more rapidly when the drive suddenly discontinues the brake pedal actuating force than when he reduces it gradually.

A modification of the propulsion control system 270 according to FIG. 8 or of its installation for charging the pressure reservoir 71 may consist of an arrangement in which, when the brake-light switch 246 or the pressure-switch 243 closes on reaching a pressure corresponding to a pressure threshold value and therewith produce an output signal, the charging control valve 271 is shifted into its shut-off position so that pressure can be built up but brake fluid cannot flow back into the tandem master cylinder 13 from the brake-calipers 19 and 21. Not until the pressure-switch 243 or the brake-light switch 226 reopens, which occurs when the pressure falls above the above-mentioned threshold value, is the recharging operation initiated. However, it should be noted thereby that the full braking force remains maintained at the brake-calipers 19 and 21 during the time interval between the removal of the actuating force at the brake pedal 11 up to the instant at which the pressure falls below the response threshold value of the pressure-switch 243 or at which the brake-light switch 246 opens, so that, as a consequence thereof, braking continues even though the driver has long ceased to wish to brake. However, the advantage of this modification resides in the fact that the pressure transducer 278 and also the second pressure-transducer 279 can be dispensed with.

As an alternative to the control unit 280 according to FIG. 9, it is also possible to substitute a differential pressure switch for the comparator 282, whose pressure chambers are acted upon by the outlet pressure of the tandem master cylinder 13 and of the monitored brake-caliper 21. This differential pressure switch produces an electrical output signal as soon as the pressure at the brake-caliper 21 exceeds the pressure in the tandem master cylinder 13, whereby the recharging cycle for the pressure reservoir 71 is initiated by the signal from the differential pressure switch, which is terminated when the monitored pressures are balanced again. This cycle repeats itself a number of times along the decreasing curve of the brake pressure decay, depending on the inertia and bias-loading of the differential pressure switch. Also with this construction of the control unit, it is possible to dispense with the analog-type pressure-transmitters 278 and 279 and the construction of the electronic control unit becomes more simple.

Figure 10:
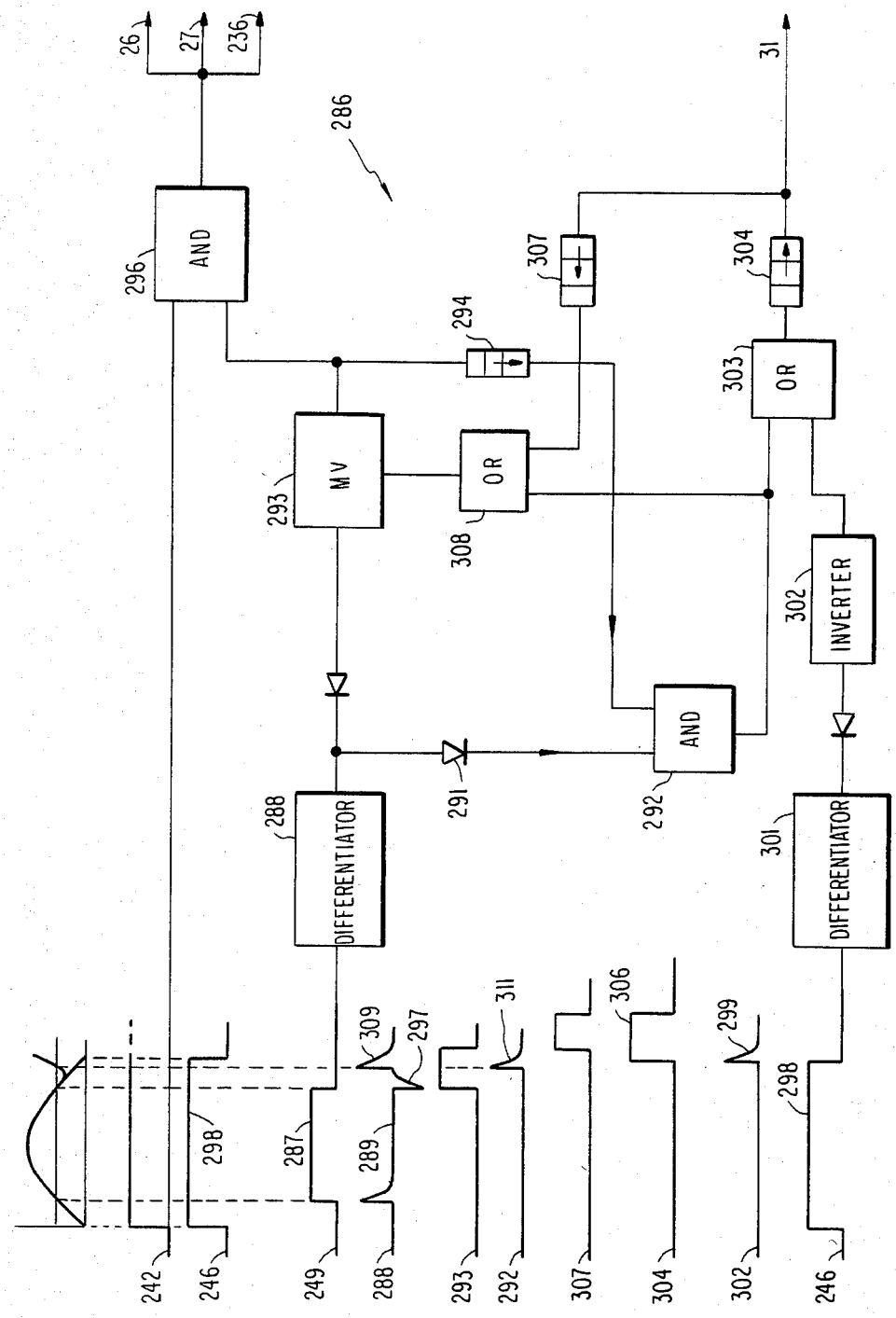
FIG. 10 is a block diagram of an additional electronic control unit according to the present invention which is particularly suitable for use within the scope of the installation according to FIG. 4.

A further possible modification of the mode of operation of the propulsion control system 200 accrding to FIG. 4, will be explained hereinafter by reference to the control unit generally designed by reference numeral 286, which is shown as schematic block diagram in FIG. 10. The purpose of the control unit 286 is a control of the charging cycles in a manner such that the pressure reservoir 71 can be charged only when it has been confirmed that, at the same time, there is no need to brake. Assuming that the reservoir 71 needs to be charged, as indicated by the high-level output signal from the pressure-switch 242, the illustrated control unit 286 operates in the following manner:

Upon actuation of the brake, a high-level output signal is produced at the second pressure-switch 243, as soon as its switching-threshold is exceeded; this signal is represented in FIG. 10 by the pulse 287. The triggering of the output signal 287 causes a differentiator 288 to produce a positive spike-pulse 289, which reaches, by way of a diode 291 polarized in the forward direction, a dual-input AND-element 292 which receives as second input signal, the output signal from an RS (set-reset) flip-flop 293, possibly with a slight decay delay, as indicated by a decay-delayed timing element 294. The flip-flop 293 has not yet been set and therefore doesnot yet emit any output signal to the series-connected dual-input AND-element 296. The negative spike-pulse 297, triggered by the decay of the output-signal pulse 287 from the second pressure-switch 243, now sets the set-reset flip-flop 293. By means of an AND-combination of the output signal from the set-reset flip-flop 293 with the high-level output signal from the first pressure-switch 242 monitoring the reservoir pressure by means of the AND element 296, the brake-pressure regulating valves 26 and 27 are shifted into their return-flow positions and the change-over valve 236 is shifted over into its second through-flow position. When the brake-pressure regulating valves 26 and 27 are in their return-flow positions, the pump-accumulator 39 of the return pump 31 is connected, in a manner permitting through-flow, to the brake-calipers 19 and 21, and can receive brake fluid from these brake-calipers. Since the return pump 31 has not yet been activated, brake fluid is not yet fed into the pressure reservoir 71. If, the foot force applied to operate the driver's brake is now discontinued, whereupon the output signal from the brake-light switch 246, represented in FIG. 10 by the high-level pulse 298, decays, then the return pump 31 is triggered by the decay-flank or trailing edge 299 of this output signal, by means of a differentiator 301, NOT or inverter element 302, and by way of a dual-input OR-element 303 and a decay-delayed timing element 304. In this operating condition of the control unit 286 and of the propulsion control system 200, brake fluid is conveyed back into the pressure reservoir 71 for the charging thereof both from the pump-accumulator 39 as also from the brake-calipers 19 and 21. The set-reset flip-flop 293 is reset by the output signal from the timing element 304, represented in FIG. 10 by the high-level pulse 306, by way of a further timing element 307, which is constructed as a rise-delayed timing element, and by way of a second dual-input OR-element 308, with the consequence that the brake-pressure regulating valves 26 and 27 and the change-over valve 236 fall back into their normal positions.

If, in contrast to the brake operation described above, the brake pressure is increased again before the brake-light switch 246 has dropped off, then the return pump 31 is likewise controlled by way of the first OR-element 303, by reason of the AND-combination of the output signal from the still set RS flip-flop 293 by means of the positive spike-pulse 309 from the differentiating element 288, which pulse is triggered when the 10-bar pressure-threshold of the second pressure-switch 243 is once again exceeded. At the same time, the set-reset flip-flop 293 is reset by the spike-pulse-shaped output signals 311 from the AND-element 292 so that also in this case the brake-pressure regulating valves 26 and 27 and the change-over valve 236, fall back into their normal positions. The return pump 31 now supplies brake fluid from the still charged pressure reservoir 71 back into the brake circuit of the driven vehicle-wheels so that during a brake-application of the kind explained above, that is, when, following an initial reduction in the braking force, this force is then increased again, the entire volume of brake fluid is available in the brake circuit within one and the same brake application—that is, when the brake-light switch 246 had not yet opened.

In conclusion, yet another modification of the propulsion control system according to FIG. 4 should be mentioned:

It is also possible to use a so-called drag or continuity switch for controlling the shifting over of the change-over valve 236, which is closed when the brake-pedal 11 is operated, and remains closed as long as the drive increases the foot force on the brake-pedal 11 or keeps it constant, and reopens as soon as the driver distontinues his foot force. The effect of this arrangement is as follows:

When the pressure-switch 242 is closed, recharging cycles cannot take place until the continuity switch, after it had once been closed, reopens, i.e., a recharging cycle is triggered only by the decay-flank or trailing edge of the output signal from the continuity switch. This type of control of the recharging cycles can be implemented by means of only a small technical expenditure.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for charging a pressure reservoir means which is provided as a pressure source in a propulsion control means of a motor vehicle, pressure being applied during control phases of the propulsion control means from said reservoir means to wheel brake means of the wheel which, at the instant in question, is tending to spin, an anti-blocking means in the vehicle having hydraulic control means for regulating the brake pressures at the wheel brake means, said hydraulic control means including brake-pressure regulating valve means individually coordinated to the wheel brake means and operable to be shifted into a pressure build-up position, a pressure-holding position, or a pressure-reduction position, a return pump means activated at least during the control phases in which pressure reduction occurs, electronic control means for shifting the brake-pressure regulating valve means in the sense of effecting propulsion control, the return pump means, activated during the pressure-reduction phases of the propulsion control, being also operable to recharge the pressure reservoir means, characterized in that the pressure reservoir means is a high-pressure reservoir which can be charged to a pressure of about 160–200 bar required for the pressure actuation of the wheel brake means, a master brake cylinder means having an outlet pressure chamber means, solenoid valve means operable to connect in the normal position thereof the outlet pressure chamber means with a brake line means leading to the brake-pressure regulating valve means of the driven wheels, the pressure reservoir means being operatively connected to said brake line means, instead of the connection of the master brake cylinder means to said brake line means, upon energization of said solenoid valve means, which is logically linked to activation of the propulsion control means, so that the reservoir means can be charged by the return pump means also operatively connected on its outlet side to said brake line means, and in that a pressure monitor means is provided responding to the pressure in the reservoir means and generating an electrical output signal operable to trigger an operation to charge the pressure reservoir means when the pressure therein drops below a minimum intended value.

2. An installation according to claim 1, characterized in that the solenoid valve means is constructed as a 3/2-way valve, in the normal position of which the outlet pressure chamber means of the master cylinder means is in communication with the brake line means leading to the brake-pressure regulating valve means while the pressure reservoir means is closed off with respect to said brake line means, whereas in the bypassing position of said solenoid valve means the pressure reservoir means is operatively connected to said pressure line means while said pressure line means is closed off with respect to said master brake cylinder means.

3. An installation according to claim 2, characterized in that the output signal from the electronic control means which controls the energization of the solenoid valve means and the activation of the return pump means, is derived from an OR-combination of the pressure build-up signals, the pressure-holding signals and the pressure reduction signals produced by said electronic control means.

4. An installation according to claim 3, characterized in that the pressure build-up signals, the pressure-holding signals and the pressure reduction signals are generated with substantially similar signal levels.

5. An installation according to claim 3, with an electrical control circuit for the return pump means, characterized in that a time-delay element is connected in the electrical control circuit for the return pump means which is operable to produce a delay in the decay of the signal controlling the activation of the return pump means relative to the output signal of the OR element.

6. An installation according to claim 1, 2, 3 or 5, characterized in that the pressure monitor means is operable to initiate a signal when the pressure in the pressure reservoir means drops below a minimum intended value, and in that said solenoid valve means is shiftable into its by-pass position during simultaneous presence of said indicating signal and of at least a further signal which indicates that vehicle stands still or is in a non-braked condition.

7. An installation according to claim 6, characterized in that simultaneous with the shifting of the solenoid valve means, also the brake-pressure regulating valve means of the driven vehicle wheels are shifted into their closing position for the purpose of charging the reservoir means.

8. An installation according to claim 7, characterized in that a pressure limiting valve is operatively connected to the pressure reservoir means, said pressure-limiting valve being operable to provide a communication of the reservoir means with a supply reservoir of the master brake cylinder means when the pressure in the reservoir means exceeds a still-permissive maximum value.

9. An installation according to claim 8, characterized in that with a shifted solenoid valve means, the outlet pressure chamber means of the master brake cylinder means is operatively connected with the reservoir means by way of a by-pass line and a check valve means thereof and thus the pressure reservoir means is operable to be statically supplied with pressure by actuation of a brake pedal.

10. An installation according to claim 9, characterized in that a pressure medium flow path means is provided from said brake line means to a return flow line leading to the inlet side of the return pump means, said flow path means including a 2/2-way solenoid valve means operable to be energized simultaneously with the energization of the solenoid valve means for the purpose of charging the reservoir means, the normal position of said 2/2-way solenoid valve means being the closing position and the energized position thereof being the through-flow position, and in that with the energization of the solenoid valve means simultaneously also the return pump means is activated so that by actuation of the brake pedal, brake fluid is forced from the master brake cylinder means into the feed space of the return pump means and the reservoir means can be charged.

11. An installation according to claim 6, characterized in that a further pump means is operable to be activated for the purpose of charging the reservoir means by a signal shifting the solenoid valve means into its by-pass position and activating the return pump means, said further pump means supplying brake fluid from the brake fluid reservoir chamber of the master brake cylinder means to a return line leading to the inlet-side of the return pump means.

12. An installation according to claim 11, characterized in that the further pump means is driven by an electrically controlled motor.

13. An installation according to claim 11, characterized in that the further pump means is constructed as a suction-driven piston pump whose vacuum chamber is operable to be connected valve-controlled by a control valve means with a vacuum source present in the vehicle, the control valve means being controlled into its by-pass position providing a communication of the vacuum chamber with the vacuum source simultaneously with the control signal energizing the solenoid valve means while the vacuum chamber is vented in the non-energized position of said control valve means, and the further pump means including piston means carrying out the suction stroke thereof during venting of the vacuum chamber means.

14. An installation according to claim 13, characterized in that in the energized position of the control valve means the vacuum chamber of the piston pump means is operatively connected with a vacuum line, by means of which a brake force booster means operating with vacuum is operatively connected with the vacuum source in the vehicle.

15. An installation according to claim 14, characterized in that the vacuum source is the intake pipe of the engine.

16. An installation according to claim 1, characterized in that a charging control means is provided which is operable to produce at least one charging signal pulse from a logical combination in the sense of an AND operation, of a first signal indicating that the pressure in the reservoir means has dropped below a minimum intended value, with a second signal resulting from an actuation of the brake means with a minimum force, said charging signal pulse being operable to provide an operative connection of the pressure reservoir means with the brake line means leading to the brake-pressure regulating valve means, the closing off of the brake line means with respect to the master brake cylinder means enabling the activation of the return pump means and the shifting of the brake-pressure regulating valve means into the return flow position.

17. An installation according to claim 16, characterized in that the charging signal pulse is produced with actuation of the vehicle brake.

18. An installation according to claim 16, characterized in that the charging signal pulse is produced time-delayed with respect to the actuation of the vehicle brake.

19. An installation according to claim 16, characterized in that a brake-line switch means is provided producing an output signal which is used as said second signal.

20. An installation according to claim 16, characterized in that a further pressure monitor means is provided responding to a pressure increase in the master brake cylinder means or in the brake line means connected thereto to produce an output signal which is used as said second signal.

21. An installation according to claim 16, 19, or 20, characterized in that charging cycles following one another in timed spacing are controlled by output pulses of a charging pulse transmitter means which is activated by the output signal of a dual input AND element, the output signal of the pressure monitor means connected to the pressure reservoir means being applied to one input of said last-mentioned AND-element, and the indicating signal resulting from actuation of the vehicle brake being applied to the other input of said last-mentioned AND-element.

22. An installation according to claim 21, characterized in that said charge pulse transmitter means is an astable multivibrator.

23. An installation according to claim 21, characterized in that a cycle counter means is provided which is set to a predetermined number of charging cycles and which is operable upon completion of said number to produce an output signal to a blocking element, said blocking element upon receipt of said output signal from said counter means being operable to block one of the two inputs of said dual input AND-element, and in that the cycle counter means is operable to be reset by disappaearance of the output signal from a brake light switch means or by the output signal of the further pressure monitor means.

24. An installation according to claim 16, characterized in that the charging cycles are triggerable only within a range of pressure values in one of the master brake cylinder means and said brake line means limited by a lower value and by an upper value.

25. An installation according to claim 24, characterized in that said lower value is about 10 bar and said upper value is about 40 bar.

26. An installation according to claim 16, characterized in that charging cycles for the pressure reservoir means are triggerable only below an upper boundary value of the pressure of about 20 bar in the master brake cylinder means.

27. An installation according to claim 26, characterized in that a decay-delaying timing element is controlled by means of the trailing edge of the output signal of a two dual input AND-element, the output signal of the pressure monitor means being fed to one input of said last-mentioned AND-element and the output signal of a further pressure monitor means being fed to the other input of said last-mentioned AND-element, said further pressure monitor means producing a high level output signal when the pressure is higher than a predetermined threshold value, said timing element being operable to produce an output signal activating as charging signal the return pump means, to shift the brake-pressure control valve means into the return flow position thereof and to initiate the operative connection of the pressure reservoir means to the brake line means and the closing thereof with respect to the master brake cylinder means.

28. An installation according to claim 27, characterized in that a cycle counter means operable to be set to a predetermined number of cycles is controllable by the trailing edge of the output signal of said last-mentioned AND-element, the final counter condition signal of said cycle counter means being operable to control a blocking element which is operable to block one of the input of said AND-element with the final counter level signal.

29. An installation with shifting valve means according to claim 16, characterized by a brake line path means from the shifting valve means to the brake-pressure regulating valve means is operable to be controllingly closed off by the charging control signal by means of a second solenoid valve means whose normal position is the through-flow position and whose energized position is the blocking position, in that a by-pass is provided with respect to said second solenoid valve means, a check valve connected in said by-pass and operable to be acted upon in the opening direction by pressure in the master brake cylinder means, and in that the pressure reservoir means is operable to be charged when the second solenoid valve means is shifted into its closing position, by way of a charging pressure line which branches off from the brake line means connecting the second solenoid valve means and the brake pressure regulating valve means, and said charging pressure line including a check valve operable to be acted upon into the closing position by the reservoir pressure.

30. An installation according to claim 29, characterized by comparator means responding to the difference of the pressures in the brake caliper means of at least one of the driven vehicle wheels and in the master brake cylinder means, said comparator means triggering a signal shifting the brake pressure regulating valve means into the return flow position thereof, and activating the return pump means when the pressure in the monitored brake caliper means is larger than in the master brake cylinder means.

31. An installation according to claim 30, characterized in that said comparator means includes a first pressure transducer means producing an output signal proportional to the pressure in the master brake cylinder means and a second pressure transmitter means operable to produce an output signal proportional to the brake fluid pressure in one of the brake caliper means of the driven vehicle wheels, and further comparator means operable to produce an output signal proportional to the difference of the input signals for triggering the charging signal when the pressure in the brake caliper means is larger than in the master brake cylinder means.

32. An installation according to claim 31, characterized by a dual input AND-element which receives at its one input the output signal of the pressure monitor means of the pressure reservoir means and at its other input the output signal of the pressure monitor means monitoring the pressure in the master brake cylinder means, and which upon exceeding a threshold value of said pressure produces a high level signal, said last-mentioned AND-element initiating by its high level output signal the activation of the return pump means and shifting the charging control valve means into its closing position, and in that the control of the brake pressure regulating valve means of the driven vehicle wheel is operable to be shifted into the return flow position by the output signal of the comparator means.

33. An installation according to claim 32, characterized in that the output signal of the comparator means indicates by its polarity that the pressure in the brake caliper means is larger than in the master cylinder means.

34. An installation according to claim 32, characterized in that said comparator means produces an output signal characteristic for a positive pressure difference between brake caliper means and brake cylinder means which is operable to activate a pulse generator means whose high level output signals are operable to shift the brake pressure regulating valve means into the return flow position thereof.

35. An installation according to claim 34, characterized in that said last-mentioned pulse transmitter means is an astable multivibrator.

36. An installation according to claim 34, characterized in that the output signal of the comparator means is proportional to the difference of the pressures in the brake caliper means and in the master brake cylinder means, and in that the pulse duty factor of the pulse generator means is proportional to the output voltage of the comparator means.

37. An installation according to claim 36, characterized in that the pulse duty factor is the ratio of the duration of its high level output pulses to the spacing between such output pulses.

38. An installation according to claim 30, characterized in that a differential pressure switch means is provided which, when the pressure in the brake caliper means is larger than in the master brake cylinder means, produces an output signal of predetermined polarity, by means of which the recharging cycles of the reservoir means are controllable.

39. An installation according to claim 38, characterized in that the output signal of predetermined polarity is a high level voltage signal.

40. An installation according to claim 29, characterized in that a signal shifting the charging valve means into the closing position thereof is operable to be initiated by the leading edge of the ouptut signal of a pressure switch means indicating that a minimum value of the pressure in the master brake cylinder means has been exceeded while the charging of the pressure reservoir means is operable to be initiated by the trailing edge of the output signal from the pressure switch means.

41. An installation according to claim 29, characterized in that a signal shifting the charging valve means into the closing position thereof is operable to be initiated by the leading edge of the output signal of a brake light switch means which indicates that the brake is actuated, while the charging of the reservoir means is operable to be initiated with the trailing edge of the output signal from the brake light switch means.

42. An installation according to claim 16, characterized in that a pulse signal is used as second signal which is triggered by the trailing edge of the output signal of a continuity switch means which is closed for such period of time until the brake actuating force increases or is constant and which produces a high level output signal.

43. An installation according to claim 42, characterized in that recharging cycles of the pressure reservoir means are operable to be initiated only within a predetermined range of the vehicle velocity limited by an upper and lower boundary value and/or of the brake deceleration.

44. An installation according to claim 43, characterized in that the electronic charging control means is operable to initiate the charging of the reservoir means from a pump reservoir of the return pump means or from the brake caliper means kept at a residual pressure after the disappearance of an output signal of the pressure monitor means provided for monitoring the pressure in the master cylinder means which is adjusted to a predetermined threshold value, only when also the brake light switch means has dropped off and, when after the dropping of the pressure switch means, the brake light switch means is still closed, the brake pressure means increases again and the pressure monitor means again responds, and in that said electronic charging control means is operable to initiate a control signal when the threshold value of said pressure monitor means is exceeded, said last-mentioned control signal being operable to shift the brake pressure regulating valve means into the normal position thereof, to enable the closing off of the reservoir means with respect to the brake line means and to initiate the return flow of brake fluid from a charged pump reservoir means into the master brake cylinder means.

45. An installation according to claim 16, characterized in that recharging cycles of the pressure reservoir means are operable to be initiated only within a predetermined range of the vehicle velocity limited by an upper and lower boundary value and/or of the brake deceleration.

46. An installation according to claim 16, characterized in that the electronic charging control means is operable to initiate the charging of the reservoir means from a pump reservoir of the return pump means or from the brake caliper means kept at a residual pressure after the disappearance of an output signal of the pressure monitor means provided for monitoring the pressure in the master cylinder means which is adjusted to a predetermined threshold value, only when also the brake light switch means has dropped of and, when after the dropping of the pressure switch means, the brake light switch means is still closed, the brake pressure means increases again and the pressure monitor means again responds, and in that said electronic charging control means is operable to initiate a control signal when the threshold value of said pressure monitor means is exceeded, said last-mentioned control signal being operable to shift the brake-pressure regulating valve means into the normal position thereof, to enable the closing off of the reservoir means with respect to the brake line means and to initiate the return flow of brake fluid from a charged pump reservoir means into the master brake cylinder means.

* * * * *